United States Patent [19]

Kawamura

[11] Patent Number: 4,542,312
[45] Date of Patent: Sep. 17, 1985

[54] LINEAR MOTOR

[75] Inventor: Mitsuhiro Kawamura, Nagasaki, Japan

[73] Assignee: Mitsubishi Denki Kabushiki Kaisha, Tokyo, Japan

[21] Appl. No.: 596,823

[22] Filed: Apr. 3, 1984

[30] Foreign Application Priority Data

Apr. 13, 1983 [JP] Japan .................. 58-66523
Jun. 6, 1983 [JP] Japan .................. 58-102005

[51] Int. Cl.⁴ ............................................. H02K 41/02
[52] U.S. Cl. ...................................................... 310/13
[58] Field of Search .................................. 310/12-14

[56] References Cited

U.S. PATENT DOCUMENTS

| | | | |
|---|---|---|---|
| 3,621,311 | 11/1971 | Von Starck | 310/13 |
| 3,644,762 | 2/1972 | Eastham | 310/13 X |
| 3,663,844 | 5/1972 | Kaut et al. | 310/13 |
| 3,958,138 | 5/1976 | Eastham et al. | 310/10 |
| 4,216,397 | 8/1980 | Popov et al. | 310/13 |
| 4,228,372 | 10/1980 | Popov et al. | 310/13 |

FOREIGN PATENT DOCUMENTS

| | | | |
|---|---|---|---|
| 298998 | 3/1971 | U.S.S.R. | 310/13 |
| 936262 | 6/1982 | U.S.S.R. | 310/13 |

Primary Examiner—Donovan F. Duggan
Attorney, Agent, or Firm—Wenderoth, Lind & Ponack

[57] ABSTRACT

A linear motor having phase armature windings which are not completely contained within a partial space of an iron core of the linear motor. The phase armature windings consist of a phase armature winding which is entirely contained within the partial space and positioned at the ends of the partial space with respect to the travelling direction of the magnetic field produced by the linear motor and of other phase armature windings which are not completely contained within the partial space. The number of the turns of the former phase armature winding is arranged to be larger than the summed number of turns of the latter phase armature windings. The former phase armature winding may be a concentric winding while the latter phase armature windings are body-belt-like windings.

12 Claims, 7 Drawing Figures

FIG. 4A    FIG. 4B
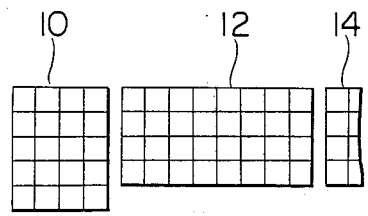
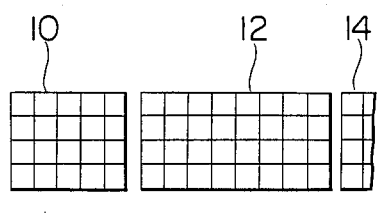
FIG. 5
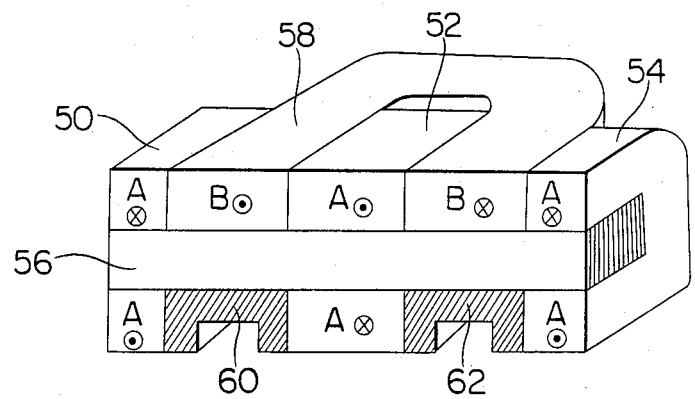
FIG. 6
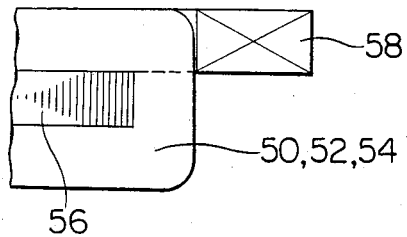

LINEAR MOTOR

BACKGROUND OF THE INVENTION

This invention relates to a linear motor, and in particular to an improved structure of the armature winding of the linear motor.

There are some armature windings of a linear motor which are not structurally contained within a partial space of an iron core completely, in order to reduce the leakage reactance due to the leakage magnetic flux from the partial space.

However, in such armature windings, if the number of the turns of a phase armature winding which is positioned at the ends of the partial space of an iron core with respect to the travelling direction of the magnetic field in a linear motor is the same as the number of the turns of one or more different phase armature windings in the partial space, the reactance of the former armature winding is lower than the reactance of the latter armature windings due to the position of the former armature winding, resulting in an inequilibrium between the reactances of the phase armature windings and, accordingly, in a deteriorated thrust characteristic.

SUMMARY OF THE INVENTION

It is accordingly an object of the present invention to provide a linear motor having a simple structure which includes two or more phase armature windings, not completely contained within a partial space of an iron core and having an equal reactance, and which has an excellent thrust characteristic.

In order to accomplish this object, the linear motor according to the present invention is arranged such that the number of the turns of the phase armature winding which is positioned at the ends of the partial space of an iron core with respect to the travelling direction of the magnetic field of the linear motor is greater than the number of the turns of the other phase armature windings in the partial space. In the preferred embodiment, the phase armature winding with the greater number of turns may employ a finer strand than the other armature windings. Also the phase armature winding with the greater number of turns may be wound on the iron core within the partial space thereof. The phase armature winding with the greater number of turns may be a concentric winding and the other phase armature windings are body-belt-like windings respectively wound on and around the iron core.

BRIEF DESCRIPTION OF THE DRAWINGS

The present invention will be more readily apparent from the preferred embodiments illustrated in the accompanying drawings in which:

FIGS. 4A and 4B show the enlarged cross-sectional structures of the winding portions at the left end shown in FIGS. 1 and 2; and, FIGS. 5 and 6 show a partially sectional perspective view and a partial side view of another embodiment adapting the present invention for a two-phase linear motor respectively.

It is to be noted that the same reference numerals indicate identical or corresponding portions.

DETAILED DESCRIPTION OF PREFERRED EMBODIMENTS

Figure 1:
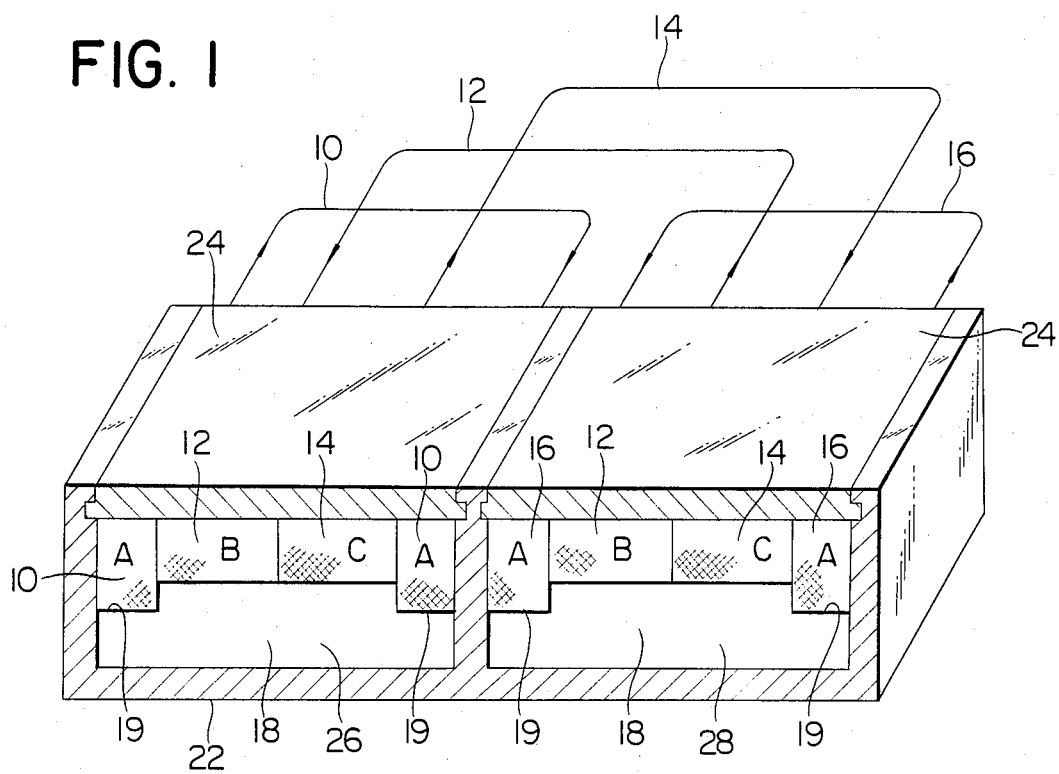
FIG. 1 shows a sectional perspective view of the armature of the linear motor according to the present invention.

Referring now to the drawings and in particular to FIG. 1, there is shown the armature of the linear motor according to the present invention in which three phase armature windings 10, 12, 14, and 16 are disposed on an iron core 18. These windings 10, 12, 14, and 16 and the iron core 18 are disposed within support structures 22 and 24 which are formed of a non-magnetic material such as stainless steel for supporting the armature windings. The armature windings 10 and 16 are disposed in notched portions 19 and are connected to phase A of the three phases A, B and C of a three phase power supply (not shown), while the armature windings 12 and 14 are connected phases B and C, respectively. The armature windings 10 and 16 are separately disposed within two partial spaces 26 and 28 of the iron core 18 respectively defined by the support structures 22 and 24, and the armature windings 12 and 14 are disposed bridging the partial spaces 26 and 28 as shown in FIG. 1, that is, the armature windings 12 and 14 are not contained within the respective partial spaces 26 and 28, so as to reduce the leakage reactance as set forth in the above.

Assuming that the number of the coil turns in each of the phase A armature windings 10 and 16 be n, and the summed number of the coil turns of the phases B and C armature windings 12 and 14 be m, these armature windings 10, 12, 14, and 16 are formed to have the following relationship according to the present invention:

$$m < 2n$$

Namely, this means that the armature windings of the linear motor are arranged such that the double number (2n) of the coil turns of the phase A armature winding 10 or 16 which is disposed at the ends of the partial space 26 or 28 with respect to the travelling direction of the magnetic field is larger than the summed number (m) of the coil turns of the other phases B and C armature windings 12 and 14.

In the operation of the structure of FIG. 1 as arranged in the above, the armature windings 10, 12, 14, and 16 have three phase currents, flowing therethrough as indicated by the arrows, wherein the respective currents in the respective phases differ in phase from each other by 120 degrees. These currents provide a travelling magnetic field. In this state, if the above assumption that the number of the coil turns of the phase A armature winding 10 or 16 which is positioned at the ends of the partial space 26 or 28 of the iron core 18 with respect to the travelling magnetic field is larger than the summed number of the turns of the phases B and C armature windings 12 and 14 is adopted, the reactance of the phase A armature winding 10 or 16 is increased to approximate the reactance of the other phase armature windings 12 and 14. Therefore, the inequilibrium between the reactances of the respective phase armature windings is improved, compared with the inequilibrium in the case where the coil turns of the three phase armature windings have the same number of turns in the partial space of the iron core, and the thrust characteristic of the linear motor is also improved.

Figure 2:
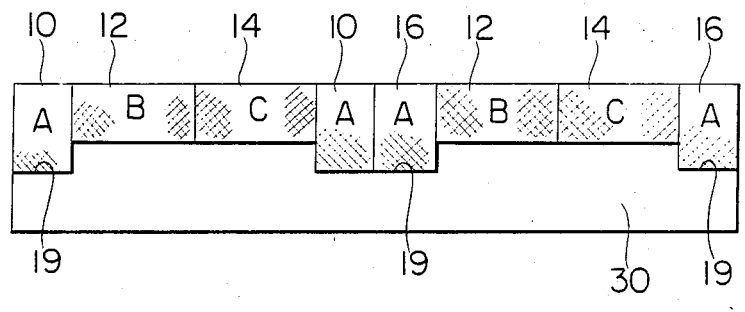
FIGS. 2 and 3 show sectional views of different embodiments of the linear motor according to the present invention respectively.
Figure 3:
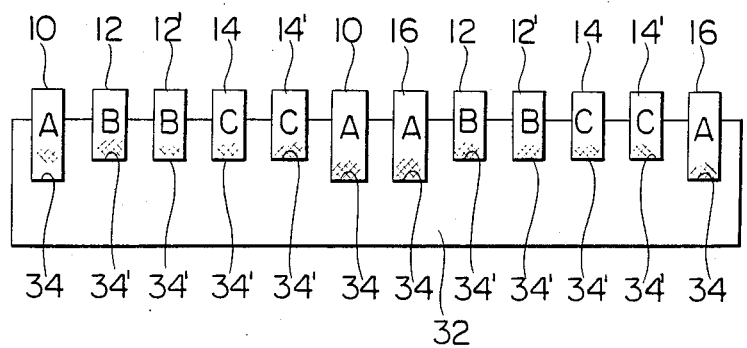

It is to be noted that the above embodiment divides the iron core 18 into two spaces 26 and 28 enclosed by the support structures 22 and 24 to support the armature windings while as shown in FIG. 2 an iron core 30 which has no divided spaces may also be effectively used. In the latter case, however, the iron core can have two identical partial spaces of the iron core 30 defined by the border between the windings 10 and 16. It is also to be noted that the iron core of the above embodiment in FIG. 1 has structually no slots and teeth but only the notched portions 19 while, as shown in FIG. 3, an iron core 32 which has slots 34 and 34' may also be effectively used. In these slots 34 and 34', the phase A armature windings 10 and 16, the phase B armature windings 12 and 12', and the phase C armature windings 14 and 14' are disposed. Also in this case, the iron core 32 has two identical partial spaces as in the case of FIG. 2.

It is further to be noted that in the above embodiments the phase armature winding positioned at the ends of the partial space of the iron core with respect to the travelling direction of the magnetic field by the linear motor use the same strand as the other armature windings whose number of the turns is fewer than that of the former, by utilizing the extra space provided by the notched portions 19 in the iron cores 18 and 30 as shown in FIGS. 1 and 2, as well as the deeper slots 34 in which the armature windings are disposed for the iron core 32 as shown in FIG. 3 while the phase armature winding, positioned at the ends of the partial space of the iron core, whose number of turns is larger may use a thinner strand than that of the other armature windings to increase the number of turns without providing any notched portions and/or deep slots.

It is still further to be noted that the above embodiments in FIG. 1-3 superflously wind the phase armature winding whose number of turns is larger, on the iron core to fill the notched portions 19 as well as the deeper slot 34 in the iron cores 18, 30 and 32 as shown in FIG. 4A while the above phase armature winding may be wound on the iron core by being extended in the lateral direction to similarly increase the number of turns without providing any notched portions and/or deep slots, as shown in FIG. 4B.

Another embodiment of this invention will now be described with reference to FIGS. 5 and 6 in which a two-phase linear motor preferably utilized in an apparatus for electromagnetically stirring up melted metal is illustrated.

Armature windings 50, 52, and 54 are connected to phase A of two phases and are wound round an iron core 56 as body-belt-like windings, and armature winding 58 is connected to phase B of the two phases, and is wound on the iron core 56 as a concentric winding. Each of the armature windings has alternating current flowing therethrough with the indicated polarities as shown in FIG. 5. The polarity of the current flowing through the armature windings 50, 52, and 54 is different in phase from that flowing through the armature winding 56 by 90 degrees. Shielding materials 60 and 62 of a high conductivity are provided to shield the magnetic flux of the phase B armature winding 58 from the rear side of the iron core 56.

Because of the current polarities of the armature windings 50, 52, 54, and 58 shown in FIG. 5 on the exposed cross-sectional face in the linear motor thus constructed, the linear motor has a travelling magnetic field generated on its upper face. An alternating magnetic flux is blocked by the mere disposition, at the rear side of the iron core 56, of the phase A armature windings 50, 52, and 54 as well as the shielding materials 60 and 62 as also seen from FIG. 6, resulting in a reduced reactance of the phase A armature windings, a desirable thrust characteristic, and no vibration of the peripheral structure.

It is to be noted that this embodiment in FIGS. 5 and 6 has an iron core 56 without slots or teeth while an iron core with slots or teeth may also be effectively used as with the case of FIGS. 1-3.

It is also to be noted that this embodiment is, provided with the shielding materials 60 and 62 while such shielding material may be deleted if no practical problem arises, and that this embodiment deals with a two-phase linear motor while a multi-phase linear motor including three phase linear motor in FIG. 1 may be applicable for this embodiment.

As in the foregoings, the linear motor of the present invention is arranged such that the number of the turns of a phase armature winding positioned at the ends of the partial space of an iron core with respect to the direction of the travelling magnetic flux of the linear motor is larger than that of the other phase armature windings which are not completely contained in the partial space, and therefore an inequilibrium between the reactances of respective phase armature windings is improved and the thrust characteristics becomes desirable. Also the combined use of a concentric winding and a body-belt-like winding advantageously make the manufacture of the windings as well as the installation of the windings for an iron core easy.

What I claim is:

1. A linear motor comprising: an iron core; and, two or more phase armature windings all of which are not completely contained in a partial space of said iron core;
    said phase armature windings being arranged such that the number of the turns of the phase armature winding positioned at the ends of partial space of said iron core with respect to the travelling direction of the magnetic field of said linear motor is greater than that of the other phase armature windings;
    wherein said phase armature winding with the greater number of turns employs a finer strand of wire than said other armature windings.

2. A linear motor according to claim 1, wherein said phase armature winding with the greater number of turns is wound on said iron core within said partial space thereof.

3. A linear motor according to claim 2, wherein said phase armature winding with the greater number of turns is a concentric winding and said other phase armature windings are body-belt-like windings respectively wound on and round said iron core.

4. A linear motor comprising: an iron core; and, two or more phase armature windings all of which are not completely contained in a partial space of said iron core;
    said phase armature windings being arranged such that the number of the turns of the phase armature winding positioned at the ends of the partial space of said iron core with respect to the travelling direction of the magnetic field of said linear motor is greater than that of the other phase armature windings;
    Wherein said phase armature windings are for a three-phase linear motor.

5. A linear motor according to claim 4, wherein the number of the turns of said other phase armature windings have the summed number less than the number of turns of said armature winding with the greater number of turns.

6. A linear motor comprising: an iron core; and, two or more phase armature windings all of which are not completely contained in a partial space of said iron core;
said phase armature windings being arranged such that the number of the turns of the phase armature winding positioned at the ends of the partial space of said iron core with respect to the travelling direction of the magnetic field of said linear motor is greater than that of the other phase armature windings;
wherein said phase armature windings are for a two-phase linear motor.

7. A linear motor comprising: and iron core; and, two or more phase armature windings all of which are not completely contained in a partial space of said iron core;
said phase armature windings being arranged such that the number of the turns of the phase armature winding positioned at the ends of the partial space of said iron core with respect to the travelling direction of the magnetic field of said linear motor is greater than that of the other phase armature windings;
wherein said iron core is divided into two partial spaces each of which contains said phase armature winding with the greater number of turns.

8. A linear motor comprising: an iron core; and, two or more phase armature windings all of which are not completely contained in a partial space of said iron core;
said phase armature windings being arranged such that the number of the turns of the phase armature winding positioned at the ends of the partial space of said iron core with respect to the travelling direction of the magnetic field of said linear motor is greater than that of the other phase armature windings;
wherein said iron core has notched portions formed therein in which said phase armature winding with the greater number of turns is disposed.

9. A linear motor comprising: an iron core; and, two or more phase armature windings all of which are not completely contained in a partial space of said iron core;
said phase armature windings being arranged such that the number of the turns of the phase armature winding positioned at the ends of the partial space of said iron core with respect to the travelling direction of the magnetic field of said linear motor is greater than that of the other phase armature windings;
wherein said iron core has deep slots formed therein in which said phase armature winding with the greater number of turns is disposed.

10. A linear motor according to claim 8, wherein said phase armature winding with the greater number of turns is disposed in said notched portions formed in said iron core in the vertical direction.

11. A linear motor comprising: an iron core; and, two or more phase armature windings all of which are not completely contained in a partial space of said iron core;
said phase armature windings being arranged such that the number of the turns of the phase armature winding positioned at the ends of the partial space of said iron core with respect to the travelling direction of the magnetic field of said linear motor is greater than that of the other phase armature windings;
wherein said phase armature winding with the larger number of turns is extended along the lateral direction of said iron core.

12. A linear lotor according to claim 8, wherein said phase armature winding with the larger number of turns is disposed in said deep slots formed in said iron core in the vertical direction thereof.

* * * * *